US011283754B2

(12) United States Patent
Peterson et al.

(10) Patent No.: US 11,283,754 B2
(45) Date of Patent: Mar. 22, 2022

(54) UNIQUE IDENTITIES OF ENDPOINTS ACROSS LAYER 3 NETWORKS

(71) Applicant: Cisco Technology, Inc., San Jose, CA (US)

(72) Inventors: Annika Lee Louise Peterson, Berkeley, CA (US); Edmund L. Wong, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 149 days.

(21) Appl. No.: 16/135,839

(22) Filed: Sep. 19, 2018

(65) Prior Publication Data

US 2020/0092251 A1    Mar. 19, 2020

(51) Int. Cl.
*H04L 29/12* (2006.01)
*H04L 61/103* (2022.01)
(Continued)

(52) U.S. Cl.
CPC .......... *H04L 61/103* (2013.01); *G06F 16/903* (2019.01); *H04L 41/0213* (2013.01);
(Continued)

(58) Field of Classification Search
CPC . H04L 41/00; H04L 41/0213; H04L 41/0246; H04L 41/0253; H04L 41/04;
(Continued)

(56) References Cited

U.S. PATENT DOCUMENTS 5,710,885 A * 1/1998 Bondi ..................... H04L 41/12
  709/224
5,835,720 A * 11/1998 Nelson ..................... H04L 41/12
  709/224

(Continued)

FOREIGN PATENT DOCUMENTS

| CN | 1319338 | 5/2007 |
| EP | 0809383 A2 | 11/1997 |
| WO | WO 00/35130 A1 | 6/2000 |

OTHER PUBLICATIONS

F. Nazir et al., "An Efficient Approach Towards IP Network Topology Discovery for Large Multi-Subnet Networks," 11th IEEE Symposium on Computers and Communications (ISCC'06), Cagliari, Italy, 2006, pp. 989-993. (Year: 2006).*

(Continued)

*Primary Examiner* — Vivek Srivastava
*Assistant Examiner* — William C McBeth
(74) *Attorney, Agent, or Firm* — Polsinelli PC

(57) ABSTRACT

Systems and methods provide for determining unique identities of endpoints across L3 networks. For example, a first networking device of a network management system in a first L3 network can receive a mapping of a first L3 network address to a first L2 network address from a second networking device in a second L3 network. The system can determine that the first L2 network address is associated with a third networking device. The system can receive a mapping of the L3 address to a second L2 network address from the third device. The system can determine that the (Continued)

second L2 address is associated with an endpoint. The system can store the L3 address and the second L2 address as an identity of the endpoint. The system can present network utilization information of the endpoint using traffic to/from the L3 address correlated to the endpoint based on its identity.

20 Claims, 10 Drawing Sheets

(51) Int. Cl.
  *G06F 16/903* (2019.01)
  *H04L 41/0213* (2022.01)
  *H04L 41/12* (2022.01)
  *H04L 41/142* (2022.01)
  *H04L 45/00* (2022.01)
  *H04L 45/745* (2022.01)
  *H04L 67/303* (2022.01)

(52) U.S. Cl.
  CPC ............ *H04L 41/12* (2013.01); *H04L 41/142* (2013.01); *H04L 45/04* (2013.01); *H04L 45/745* (2013.01); *H04L 67/303* (2013.01)

(58) Field of Classification Search
  CPC ..... H04L 41/046; H04L 41/12; H04L 41/142; H04L 41/22; H04L 43/00; H04L 43/04; H04L 43/045; H04L 43/06; H04L 43/062; H04L 43/065; H04L 43/067; H04L 43/0811; H04L 43/0876; H04L 43/0882; H04L 43/0888; H04L 43/0894; H04L 61/10; H04L 61/103
  See application file for complete search history.

(56) References Cited

U.S. PATENT DOCUMENTS

| | | | |
|---|---|---|---|
| 6,292,838 B1* | 9/2001 | Nelson ................... | H04L 61/10 709/236 |
| 6,442,144 B1* | 8/2002 | Hansen ................... | H04L 41/12 370/255 |
| 6,862,286 B1* | 3/2005 | Tams ...................... | H04L 41/12 370/395.32 |
| 7,440,424 B2 | 10/2008 | Nam et al. | |
| 9,009,304 B2 | 4/2015 | Malloy et al. | |
| 9,398,045 B2 | 7/2016 | Lee | |
| 2003/0009540 A1* | 1/2003 | Benfield ............. | H04L 41/0213 709/220 |
| 2005/0114507 A1* | 5/2005 | Tarui ...................... | H04L 41/12 709/224 |
| 2005/0138157 A1 | 6/2005 | Jung et al. | |
| 2006/0140127 A1 | 6/2006 | Lee et al. | |
| 2006/0165056 A1 | 7/2006 | Komaki | |
| 2006/0267802 A1 | 11/2006 | Judge et al. | |
| 2007/0115967 A1* | 5/2007 | Vandenberghe ........ | H04L 41/12 370/389 |
| 2009/0129290 A1* | 5/2009 | Seo ......................... | H04L 41/12 370/254 |
| 2010/0235360 A1* | 9/2010 | Robinton ............. | H04L 41/0213 707/741 |
| 2010/0278071 A1* | 11/2010 | Hattori .................... | H04L 41/12 370/254 |
| 2012/0226798 A1* | 9/2012 | Krishna .............. | H04L 41/0213 709/224 |
| 2013/0124721 A1* | 5/2013 | Prasadam ............... | H04L 41/12 709/224 |
| 2013/0326047 A1* | 12/2013 | Easty ...................... | H04L 41/22 709/224 |
| 2014/0112349 A1* | 4/2014 | Moreno ................ | H04L 61/103 370/400 |
| 2014/0258509 A1* | 9/2014 | Raghuraman ....... | H04L 43/0876 709/224 |
| 2014/0317270 A1* | 10/2014 | Besehanic ............. | H04L 61/103 709/224 |
| 2016/0044494 A1* | 2/2016 | Bang ..................... | H04W 24/02 370/254 |
| 2016/0344689 A1* | 11/2016 | Grevers, Jr. .......... | H04L 61/103 |
| 2017/0195856 A1* | 7/2017 | Snyder .................. | H04W 8/005 |
| 2018/0124009 A1* | 5/2018 | Kerkes .................. | H04L 61/103 |
| 2018/0219751 A1* | 8/2018 | Cavuto ................. | H04L 43/045 |
| 2018/0375953 A1* | 12/2018 | Casassa Mont .... | H04L 41/0213 |
| 2019/0327600 A1* | 10/2019 | Kapilevich ......... | H04L 41/0853 |

OTHER PUBLICATIONS

Z. Najeeb, F. Nazir, S. Haider, H. Suguri, H. F. Ahmad and A. Ali, "An intelligent self-learning algorithm for IP network topology discovery," 2005 14th IEEE Workshop on Local & Metropolitan Area Networks, Crete, 2005, pp. 6 pp. 6 (Year: 2005).*
J. Yin, Y. Li, Q. Wang, B. Ji and J. Wang, "SNMP-based network topology discovery algorithm and implementation," 2012 9th International Conference on Fuzzy Systems and Knowledge Discovery, Sichuan, 2012, pp. 2241-2244. (Year: 2012).*
Melvin, Stephen. "Endpoint Identification Using System Logs." the Proceedings of the 22nd ACM Symposium on Operating System Principles (SOSP), Big Sky, Montana. 2009. (Year: 2009).*
Zhou, Y. T., et al. "Discovery algorithm for network topology based on SNMP." International Conference on Automation, Mechanical Control and Computational Engineering. Atlantis Press. 2015. (Year: 2015).*
International Search Report and Written Opinion from the International Searching Authority, dated Nov. 8, 2019, 12 pages, for corresponding International Patent Application No. PCT/US2019/050891.
Anonymous, "Get DHCP leases with SNMO," Ubiquiti Community, Jan. 1, 2017, XP055636652, 2 pages.
Anonymous, "cisco—How to find a list of devices connected to my network (IP's and MACs)," Network Engineering Stack Exchange, Jun. 1, 2013, XP055636655, 3 pages.

* cited by examiner

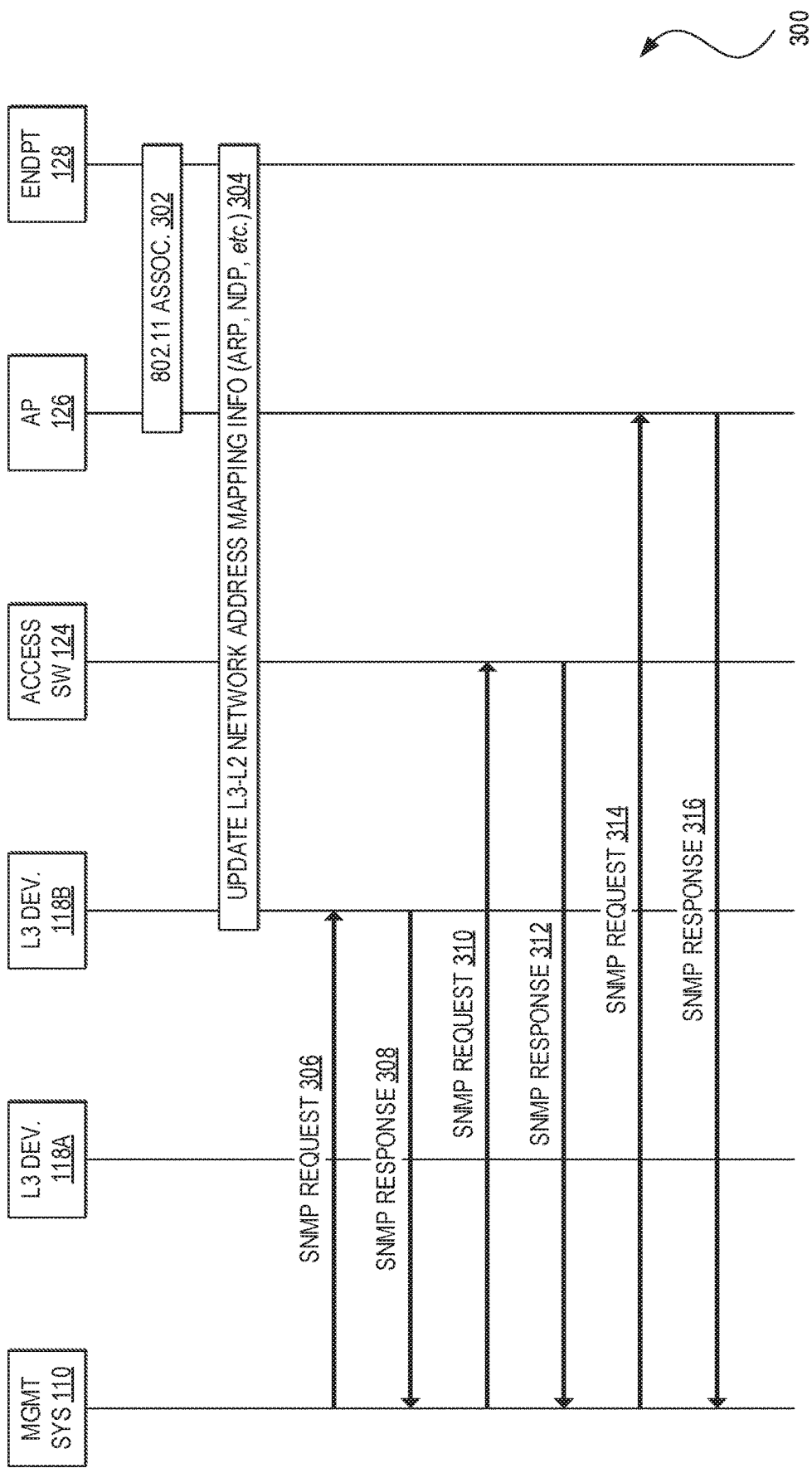

US 11,283,754 B2

UNIQUE IDENTITIES OF ENDPOINTS ACROSS LAYER 3 NETWORKS

TECHNICAL FIELD

The subject matter of this disclosure relates in general to the field of telecommunications networks, and more particularly, to systems and methods for determining unique identities of endpoints across Layer 3 networks.

BACKGROUND

Cloud networking (sometimes also referred to as cloud-based networking, software-defined wide area networking (SD-WAN), or Cloud WAN) describes the access of networking resources by a private network (e.g., a first Layer 3 (L3) network) from an external network provider (e.g., a second L3 network) using WAN or Internet-based access technologies. Cloud networking can provide for centralized management and control without the cost and complexity of on-premise network controller appliances or overlay network management systems. Cloud networking can also involve the management of distributed wireless access networking devices or branch-office networking devices using centralized management in the cloud. Cloud networking can allow for the creation and management of secure private networks via WAN connections and a centralized management function that can reside in a data center. Cloud networking can also enable connectivity, security, management, and control functions to be pushed to the cloud and delivered as a service. Current cloud networking implementations, however, suffer from various drawbacks, such as limitations with regard to visibility of endpoints across L3 networks.

BRIEF DESCRIPTION OF THE FIGURES

To provide a more complete understanding of the present disclosure and features and advantages thereof, reference is made to the following description, taken in conjunction with the accompanying drawings, in which:

FIGS. 3A-3D illustrate examples of flow diagrams of processes for determining unique identities of endpoints across L3 networks in accordance with some embodiments;

DESCRIPTION OF EXAMPLE EMBODIMENTS

Figure 1:
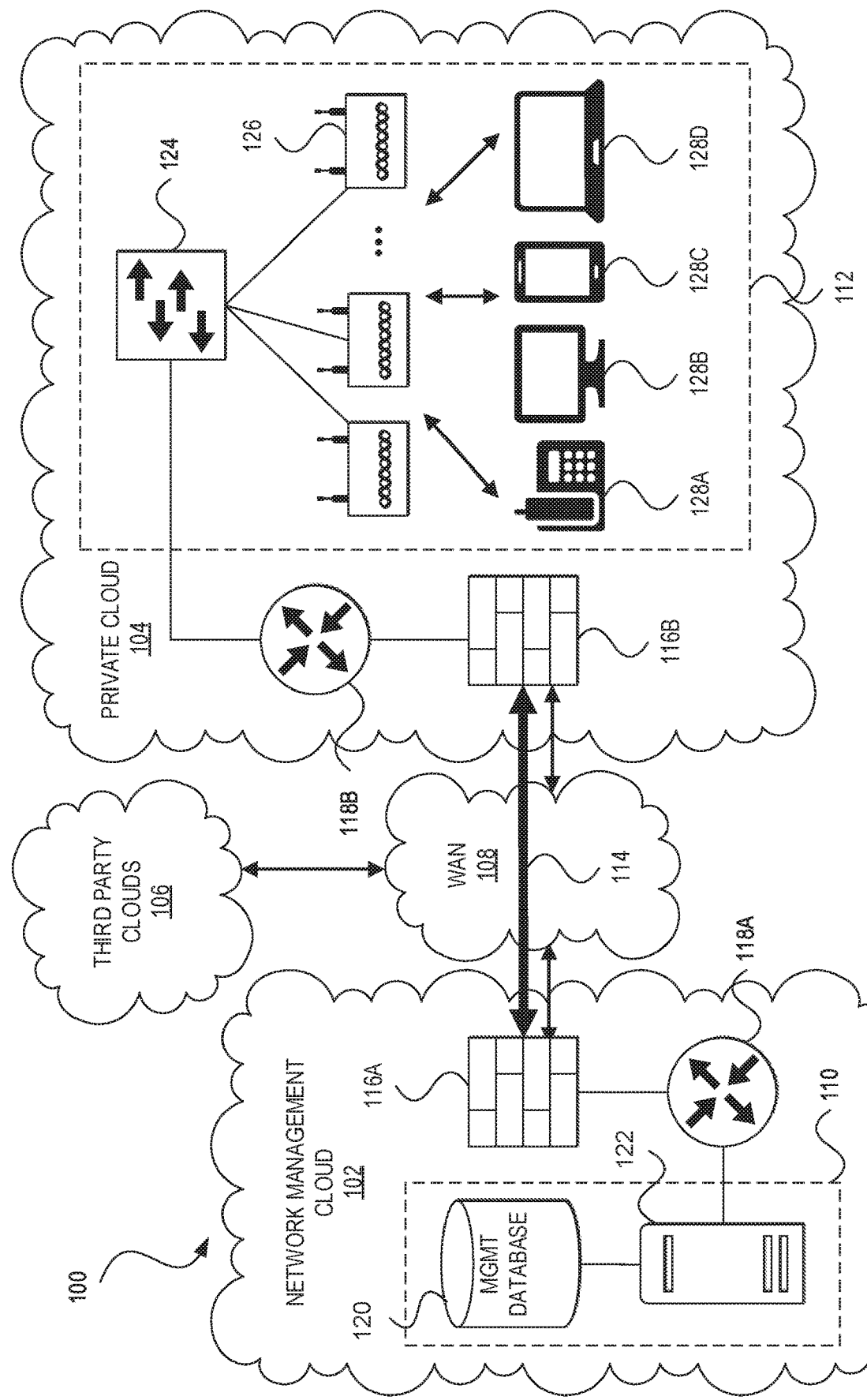
FIG. 1 illustrates an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for determining unique identities of endpoints across Layer 3 (L3) networks. In an embodiment, a first L3 networking device (e.g., switch, router, gateway, etc.) of a network management system in a first L3 network (e.g., a cloud provider network) can receive a first mapping of an L3 network address (e.g., an Internet Protocol (IP) address) to a first Layer 2 (L2) network address (e.g., a Media Access Control (MAC) address) from a second networking device in a second L3 network (e.g., a private network). The network management system can determine that the first L2 network address is associated with a second networking device in the second L3 network. The network management system can request for and receive a second mapping of the L3 network address to a second L2 network address. The network management system can determine that the second L2 network address is associated with an endpoint of the second L3 network. The network management system can store the first L3 network address and the second L2 network address as a unique identity of the endpoint. The network management system can monitor and present network utilization information of the endpoint using network traffic to/from the L3 network address correlated to the endpoint based on the unique identity of the endpoint.

EXAMPLE EMBODIMENTS

Some network management systems may identify endpoints by L2 network addresses (e.g., MAC addresses), such as by analyzing traffic flowing through a network gateway, the gateway's routing tables, ARP tables, NDP neighbor tables, or similar L3-L2 network address mapping information. This approach, however, may not accurately identify endpoints because of the manner of how many L3 networking devices operate. For example, an L3 networking device may change the L2 network address of IP packets received to/from downstream or next hop networking devices to be its own L2 network address. Thus, an upstream network or networking device may associate the IP address of an endpoint with the MAC address of the L3 networking device. This can result in the upstream network or networking device identifying endpoint traffic as the L3 networking device's traffic.

Some network management systems may identify endpoints by L3 network addresses. This approach may also be flawed because many L3 networks can assign the same L3 network address to a plurality of endpoints over a period of time. For example, wireless local area networks (WLANs), enterprise networks, Internet of Things (IoT) environments, Voice over IP (VoIP) systems, and similar networks can comprise numerous networking devices and endpoints but may only have a limited number of IP addresses. These networks can dynamically allocate IP address to endpoints and may assign the same IP address to multiple devices. An upstream network or networking device may identify endpoint traffic as a single endpoint's traffic but some or all of the traffic may actually originate from another endpoint or multiple other endpoints.

Correct identification of endpoints can be critical for network management. For example, network assurance, quality of service (QoS), analytics, and the like, may depend on accurately distinguishing endpoints from one another and from networking devices. As another example, it may not be possible to implement endpoint-based network policies, such as whitelist rules (e.g., network policies that allows access by an endpoint only if a policy exists to permit the access) or blacklist rules (e.g., network policies that permit access by an endpoint unless a policy exists to prohibit the access) expressed using endpoint identifiers, without confidence in the accuracy of those identifiers. As yet another example, network topology discovery may require distinct identities for endpoints.

Various embodiments of the present disclosure can overcome the above and other deficiencies of the prior art by uniquely identifying endpoints by mappings of IP addresses and MAC addresses. A network can maintain a database of IP-MAC address mappings to represent the canonical identities of the endpoints at specified periods of time. The network can continuously update the database to reflect the current state of the endpoints. Various network management applications and services, such as assurance, QoS, analytics, security, network topology mapping, among others, can rely on the IP-MAC address mappings information for accurate identifications of the endpoints.

FIG. 1 illustrates an example of a network environment 100 in which to deploy the subject technology. It should be understood that, for the network environment 100 and any environment discussed herein, there can be additional or fewer nodes, devices, links, networks, or components in similar or alternative configurations. Example embodiments with different numbers and/or types of endpoints, networks, nodes, cloud components, servers, software components, devices, virtual or physical resources, configurations, topologies, services, appliances, deployments, or networking devices are also contemplated herein. Further, the network environment 100 can include any number or type of resources, which can be accessed and utilized by endpoints or tenants. The illustrations and examples provided herein are for clarity and simplicity.

The network environment 100 can include a network management cloud 102; a private cloud 104; third party clouds 106 for providing various third-party content and services, such as email, media content (e.g., video, music, gaming, etc.), online banking, and social networking, and so forth; and a WAN 108 (e.g., the Internet) interconnecting the network management cloud 102, the private cloud 104, and the third party clouds 106. The network management cloud 102 can host a network management system 110 for administering a wireless LAN (WLAN) 112 in the private cloud 104. The cloud-hosted network management system 110 may be configured to manage the configuration and operation of various devices in a LAN, such as the WLAN 112, and/or across geographically distributed portions of one or more virtual LANs (VLANs).

A secure connection 114 can be established between the network management cloud 102 and the private cloud 104 via a first security appliance 116A and a first L3 networking device 118A in the network management cloud 102 and a second security appliance 116B and a second L3 networking device 118B in the private cloud 104 (collectively, security appliances 116 and L3 networking devices 118, respectively). In addition to establishing the secure connection 114, the security appliances 116 can also provide other networking services, such as virtual private network (VPN) concentration, firewalling, directory services, certificate authority services, policy management, intrusion detection and prevention, load balancing, WAN acceleration, content filtering, and so forth. In some embodiments, Cisco Meraki® MX devices can operate as the security appliances 116. In some embodiments, Cisco Catalyst®, Cisco Nexus®, and/or Cisco Meraki® MS switches can operate as the L3 networking devices 118. Still other embodiments may utilize multiple vendors for providing the functionality of the security appliances 116 and the L3 networking devices 118.

The secure connection 114 can be used by devices of the network management system 110 and the WLAN 112 to exchange management data (e.g., configuration, statistical, or monitoring data). The secure connection 114 can be implemented in various ways, such as utilizing VPN or L2 tunneling protocols. In some embodiments, an open VPN (e.g., OpenVPN) overlay or an IP Security (IPSec) VPN-based L3 network extension can be used to provide the secure connection 114. In other embodiments, a secure transport layer (i.e., L4) tunnel can be used as the secure connection 114 between the security appliances 116, such as by utilizing Transport Layer Security (TLS), Datagram TLS (DTLS), Secure Socket Layer (SSL), etc., across the WAN 108.

The secure connection 114 may utilize portions of the WAN 108. For example, packets that are transmitted via the secure connection can be marked and/or contain header fields that enable the prioritization of the secure tunnel packets on at least some portions of the WAN 108. In some example embodiments, the prioritization of the secure tunnel packets can include the use of private, dedicated routing paths between the network management system 110 and the WLAN 112 to reduce latency and/or improve reliability.

The cloud-hosted network management system 110 can include a management database 120 and a network management server 122. The network management server 122 can manage cloud operations, endpoint communications, service provisioning, network configuration and monitoring, etc. The management database 120 may store configuration information, statistics, monitoring information, and other management data relating to the WLAN 112. In some embodiments, the Cisco Meraki® Cloud Networking platform can operate as the cloud-hosted network management system 110.

The WLAN 112 can include an access switch 124 (e.g., an L2/L3 networking device), access points 126, and endpoints, such as a desk phone 128A, desktop computer 128B, smartphone 128C, and laptop 128D (collectively, endpoints 128). The endpoints 128 can also include servers, tablets, wearable devices, security cameras, Internet of Things (IoT) devices, or other devices capable of electronically transmitting and receiving audio, video, and/or other data over a distance. Each of the endpoints 128 can include one or more processors, one or more types of memory, a display, and/or other user interface components such as a keyboard, touch screen display, mouse, track-pad, digital camera, and/or any number of peripheral devices or components to add functionality for the endpoint. The endpoints 128 can also be capable of protocol processing, modulation, demodulation, data buffering, power control, routing, switching, clock recovery, amplification, decoding, and/or error control.

The access switch 124 can function as a LAN interface between the L3 networking device 118B and the access points 126. The access points 126 can provide network access to the endpoints 128 in the WLAN 112. The security appliance 116B, the L3 networking device 118B, the access switch 124, and the access points 126 can be configured to communicate and operate in accordance with configuration instructions, software and/or firmware updates, and rules provided by the network management system 110. In some embodiments, the functions of the security appliance 116B, the L3 networking device 118B, the access switch 124, and the access points 126 can be integrated into a single physical device, such as Cisco Meraki® MR access points. Other embodiments may combine different functional elements of a network, such as a security appliance and an L3 networking device integrated into a single physical device like Cisco Meraki® MX devices; an L3 router and an L2 switch integrated into a single physical device like Cisco Meraki® MS switches; an L3 router, an L2 switch, and a wireless access point integrated into a single physical device like Meraki® MR access points; and so forth. Still other embodiments may utilize multiple vendors for each of the functional elements of a network.

Figure 2:
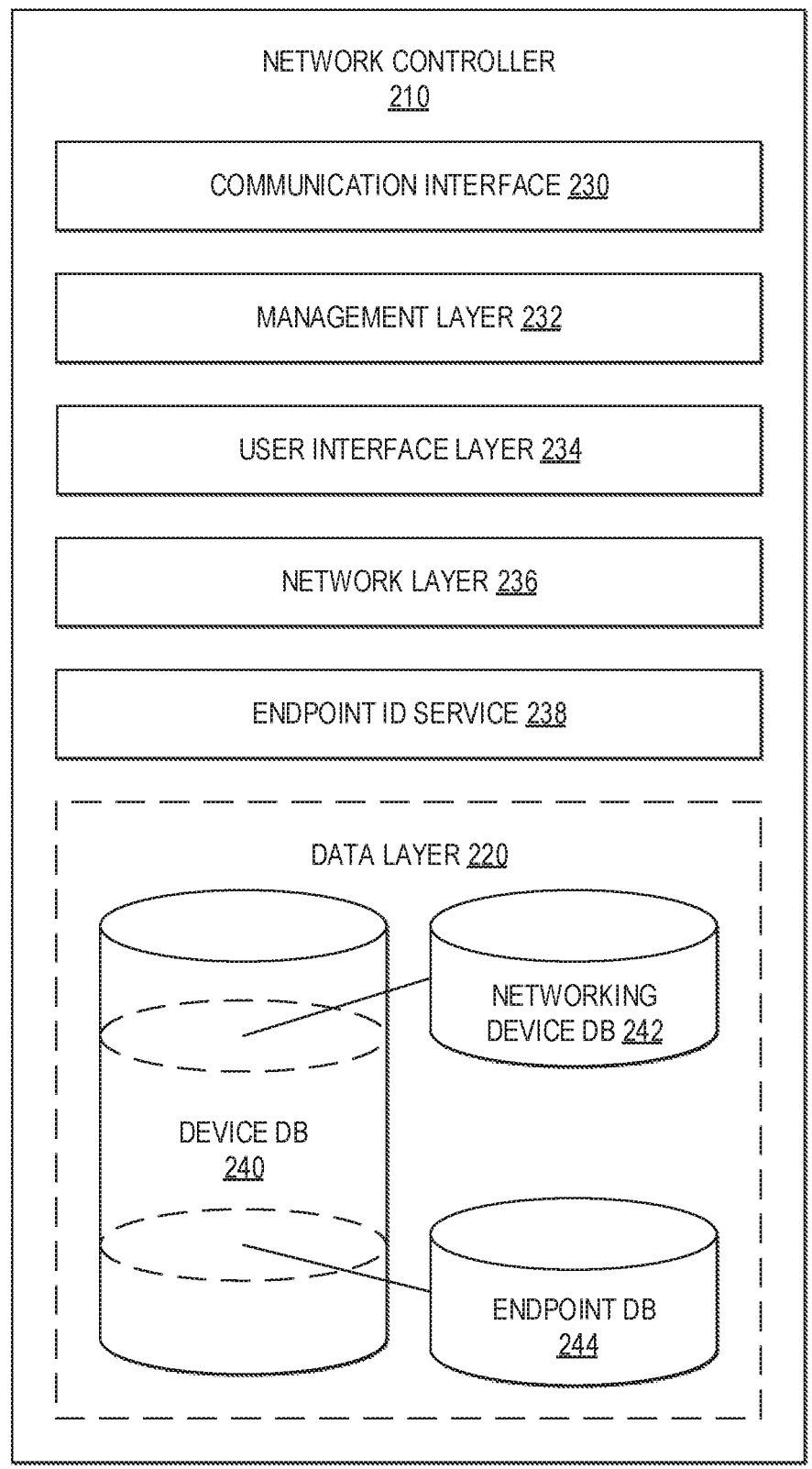
FIG. 2 illustrates an example of a controller for a cloud-based network management system in accordance with an embodiment.

FIG. 2 illustrates an example of a network controller 210 for a cloud network management system (e.g., the cloud network management system 110). One of ordinary skill in the art will understand that, for the network controller 210 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The network controller 210 can be remotely hosted in a management network (e.g., the network management cloud 102), and can serve as a network management system for managing and controlling elements of the management network and one or more private networks (e.g., the private cloud 104), including networking devices (e.g., the security appliance 116B, the L3 networking device 118B, the access switch 124, the access points 126, etc.) and/or endpoints (e.g., the endpoints 128), for the customers of a provider of the cloud networking services. For example, the network controller 210 can manage various cloud services, such as provisioning cloud resources in a management network, configuring and updating the cloud resources, monitoring the cloud resources, implementing high availability and failover for the cloud resources, enforcing security and compliance for the cloud resources, and so forth. The network controller 210 can also send network data to and receive network data from endpoints to facilitate configuration of the endpoints; monitor a private network and status information of networking elements of the private network, such as a secure connection (e.g., the secure connection 114), a private network gateway (e.g., the security appliance 116B), routers (e.g., the L3 networking device 118A), L2/L3 switches (e.g., the access switch 124), and access points (e.g., the access points 126), among other elements; and administer the private network and the elements of the private network.

The network controller 210 can include several components or modules, such as a communication interface 230, a management layer 232, a user interface layer 234, a data layer 220, a network layer 236, a endpoint ID service 238, and a data layer 220. These modules may be implemented as hardware, firmware, and/or software components. Although FIG. 2 illustrates an example configuration of the various components of the network controller 210, those of skill in the art will understand that the components of network controller 210 or any device described herein can be configured in a number of different ways and can include any other type and number of components. For example, the management layer 232 and the network layer 236 can belong to one software module or multiple separate modules. Other modules can also be combined into fewer components and/or further divided into more components.

The communication interface 230 may allow the network controller 210 to communicate with endpoints, as well as any other device or network. The communication interface 230 can comprise a network interface card (NIC), and can include wired and/or wireless capabilities. The communication interface 230 may allow the network controller 210 to send and receive data from other devices and networks. The network controller 210 can include multiple communications interfaces for redundancy or failover. For example, the network controller 210 can include dual NICs for connection redundancy.

The management layer 232 can include logic to perform management operations. For example, the management layer 232 can include logic to allow the various components of the network controller 210 to interface and work together. The management layer 232 can also include logic, functions, software, and procedures to allow the network controller 210 to perform monitoring, management, control, and administration of devices in a private network, applications in the private network, services provided to the devices, or any other component or procedure. The management layer 232 can include logic to operate the network controller 210 and perform particular services configured by the network controller 210. The management layer 232 may also initiate, enable, or launch other instances of the network controller 210. In some embodiments, the management layer 232 can also provide authentication and security services for a management network, the network controller 210, a private network, endpoints, and/or any other device or component. Further, the management layer 232 can manage nodes, resources, settings, policies, protocols, communications, and so forth.

The user interface layer 234 can provide a frontend that endpoints can utilize to access or consume cloud services. For instance, the user interface layer 234 can provide a web-based dashboard, a desktop application, a mobile app, or other suitable interface where administrators can configure endpoints or private networks that are cloud-managed, provide user preferences, specify policies, enter data, review statistics, configure interactions or operations, and so forth. The user interface layer 234 may also provide visibility information, such as views of a private network or endpoints. For example, the user interface layer 234 can provide a view of the status or conditions of the private network, the operations taking place, services, performance, a topology or layout, specific networking devices, protocols implemented, running processes, errors, notifications, alerts, network structure, ongoing communications, data analysis, and so forth.

In some embodiments, the user interface layer 234 can provide a graphical user interface (GUI) for a user to monitor a private network, devices, statistics, errors, notifications, and so forth, and make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In an embodiment, the user interface layer 234 can also handle user or endpoint requests. For instance, an administrator or an endpoint can enter a service request through the user interface layer 234.

The network layer 236 can perform networking calculations, such as network addressing, or networking service or operations, such as auto VPN configuration or traffic routing. The network layer 236 may also perform filtering functions, switching functions, failover functions, high availability functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the network layer 236 can handle networking requests from other networks or devices and establish links between devices. In some embodiments, the network layer 236 can perform queuing, messaging, and protocol operations.

The data layer 220 can include any data or information, such as management data, statistics, settings, preferences, profile data, logs, notifications, attributes, configuration parameters, endpoint information, network information, etc. For example, the network controller 210 can collect network statistics from endpoints and store the statistics as part of the data layer 220. The data layer 220 may also include performance and/or configuration information, and the network controller 210 can use the data layer 220 to perform management or service operations for endpoints. The data layer 220 may be stored on a storage or memory device on the network controller 210, a separate storage device connected to the network controller 210, or a remote storage device in communication with the network controller 210.

The data layer 220 can include a device database 240 for inventorying the devices of a network. The device database 240 can store device information, such as the device's IP address, MAC address, name, type, manufacturer, model, serial number, status (e.g., online or offline), network policy or policies, capabilities, Cisco® Discovery Protocol and/or Link Layer Discovery Protocol (LLDP) information, channel width, access point to which it is connected, timestamp of when first seen by the network, timestamp of when last seen by the network, description, metadata tags, operating system, port, Service Set Identifier (SSID), network usage (e.g., in bytes, packets; total usage or per interface), user, VLAN, geofencing status, enrollment date, quarantine status, and so forth.

In some embodiments, the device database 240 may be partitioned to include a networking device database 242 and an endpoint database 244. The networking device database 242 can quickly identify whether a given MAC address corresponds to a known networking device of the network. The networking device database 242 can store MAC addresses in Extended Unique Identifier (EUI)-48 format (e.g., MM:MM:MM:SS:SS:SS) or in EUI-64 format (e.g., MM:MM:MM:SS:SS:SS:SS:SS), where the first 3 bytes can represent an Organizationally Unique Identifier (OUI) assigned by an Internet standards body to a manufacturer and the remaining bytes can represent a device serial number assigned by the manufacturer. In some embodiments, the networking device database 242 may be implemented as a data mart (e.g., a subset of a database configured to provide faster access to the subset of data) or other optimized view of networking device information. In such embodiments, the networking device database 242 can additionally or alternatively comprise rules or operations for resolving whether a given MAC address corresponds to a known networking device. In some embodiments, the networking device database 242 may be implemented using content-addressable memory (CAM). The endpoint database 244 can uniquely identify endpoints in the network by a combination of IP addresses and MAC addresses. The endpoint database 244 can represent the canonical source of identities of endpoints.

The endpoint ID service 238 can track the unique identification of endpoints by mappings of IP addresses and MAC addresses. The endpoint ID service 238 can periodically update the endpoint database 244 to ensure that the database reflects the current state of the network. In some embodiments, the update can occur at regular intervals of time, such as every second, minute, hour, or other suitable time scale. Alternatively or in addition, the update can be event-driven, such as when a networking device becomes disconnected and reconnects to the network or when an IP address is detected for the first time in the network or detected after a predetermined period of time since the IP address was last detected in the network.

The endpoint ID service 238 can utilize various techniques for managing unique identities of endpoints in the network. For example, the endpoint ID service 238 can retrieve the IP-MAC address mappings for a networking device's downstream devices (e.g., other networking devices or endpoints). If the networking device's downstream device is a MAC address that corresponds to a known networking device (e.g., matches a MAC address or rule in the networking device database 242), the endpoint ID service 238 can cause the downstream device to retrieve the IP-MAC address mappings for each of its downstream devices and so forth until a true endpoint for a MAC address is acquired. The endpoint ID service 238 can utilize various protocols and technologies for retrieving IP-MAC address mapping information from networking devices and their downstream devices, such as Simple Network Management Protocol (SNMP), Neighbor Discovery Protocol (NDP), Internet Control Message Protocol (ICMP), Address Resolution Protocol (ARP), Dynamic Host Configuration Protocol (DHCP), CDP, LLDP, Industry Standard Discovery Protocol (ISDP), Network Configuration Protocol (NETCONF)/Yet Another Next Generation (YANG), gRPC Remote Procedure Calls (gRPC), Secure Shell, Telnet, OpenFlow™, or similar protocols and technologies.

Table 1 sets forth an example of pseudo-code of one possible way for the endpoint ID service 238 to find the true MAC addresses of endpoints for a given networking device of a network.

TABLE 1

Example of Pseudo-code for Managing
IP-MAC Address Mappings to Uniquely Identify Endpoints

```
1.  manageEndpointIdentities(networkDevice A) {
2.    for each downstreamDevice B of A {
3.      // get IP address observed by B
4.      ipAddr = B.getIpAddress( );
5.
6.      // get MAC address observed by B
7.      macAddr = B.getMacAddress( );
8.      if (ipAddr is in A's network &&
9.          macAddr != known network device in A's network) {
10.       // macAddr is true endpoint MAC address;
11.       // Update Endpoint DB with IP-MAC mapping
12.       updateEndpointDB (ipAddr, macAddr);
13.     } else {
14.       // macAddr is associated with networking device;
```

TABLE 1-continued

Example of Pseudo-code for Managing
IP-MAC Address Mappings to Uniquely Identify Endpoints

```
15.      // Recursion to find true endpoint MAC address
16.      manageEndpointIdentities(B);
17.    }
18.  }
19. }
```

Figure 3B:
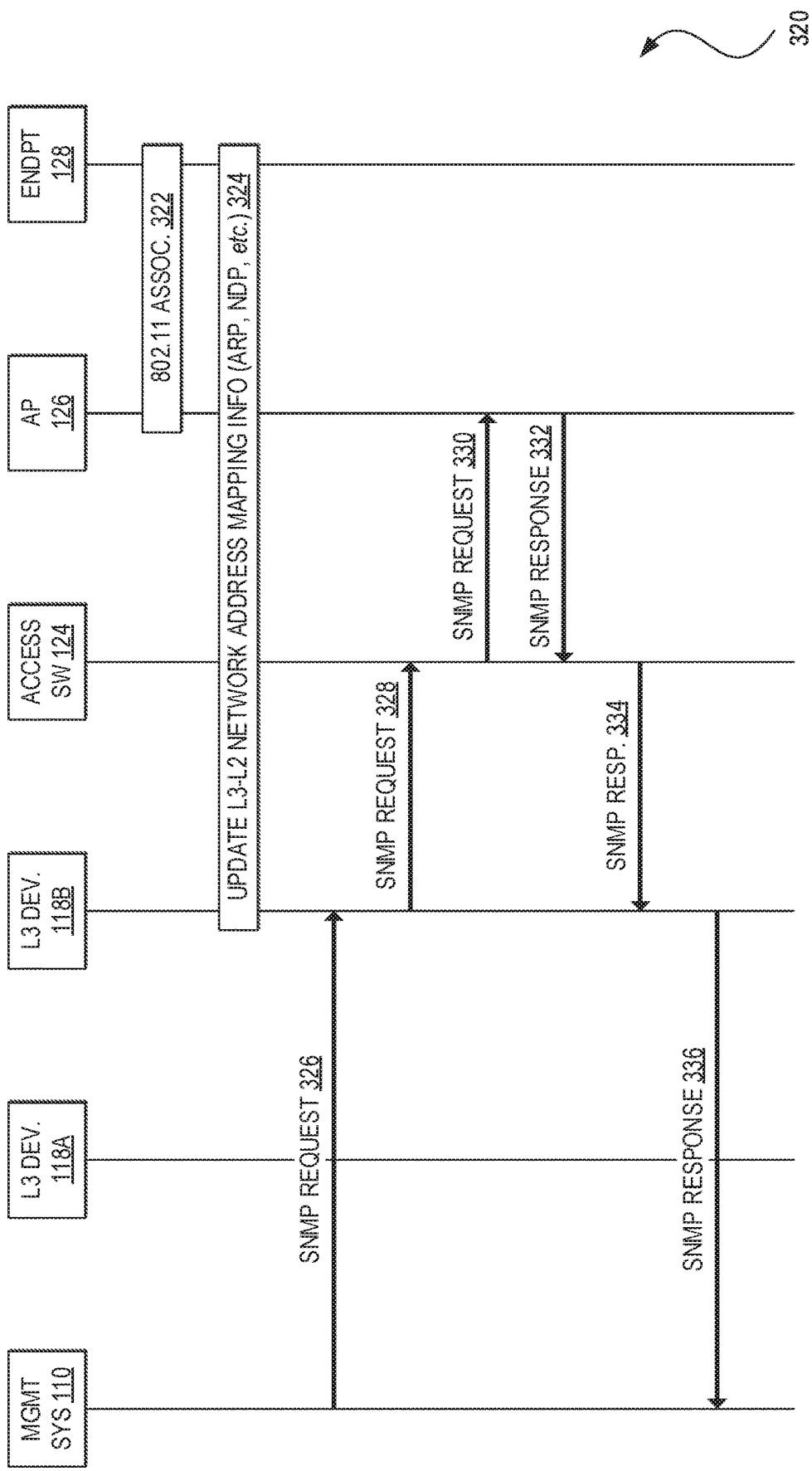
Figure 3C:
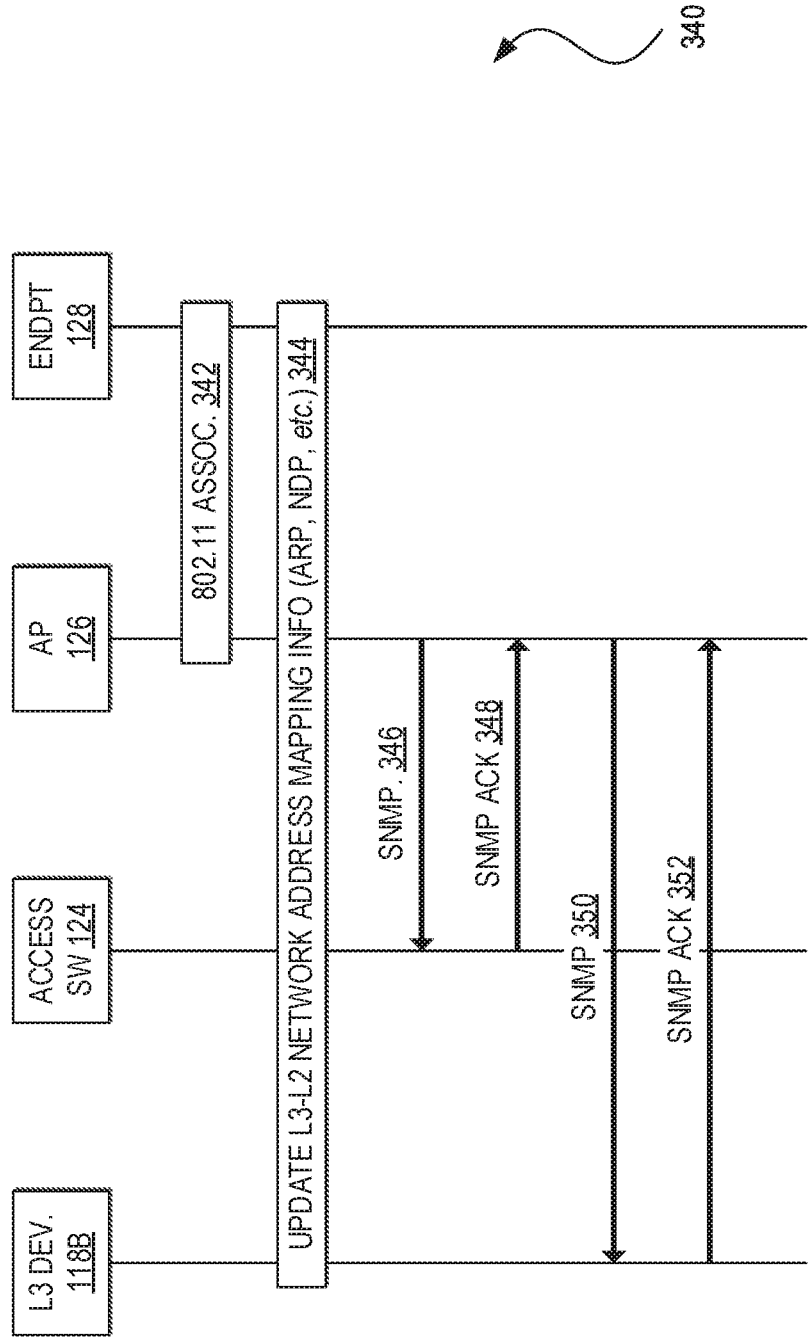
Figure 3D:
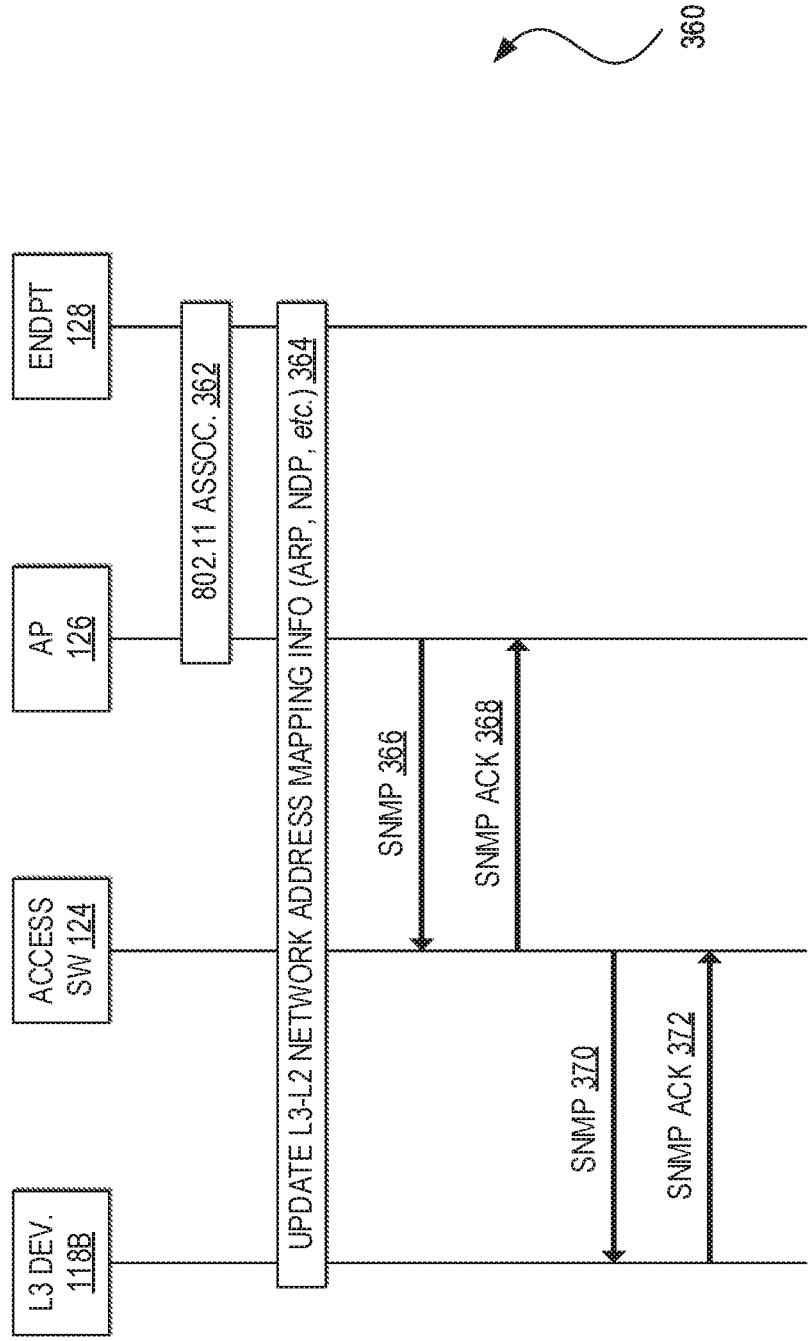

FIGS. 3A-3D illustrate examples of flow diagrams of processes for determining unique identities of endpoints across L3 networks. FIGS. 3A and 3B show examples of processes that can be centrally managed, such as by a network management system (e.g., the network management system 110). FIGS. 3C and 3D show examples of decentralized processes in which networking devices themselves can operate as a network management system. One of ordinary skill will understand that, for any processes discussed herein, there can be additional, fewer, or alternative steps performed in similar or alternative orders, or in parallel, within the scope of the various embodiments unless otherwise stated.

FIG. 3A shows a centrally managed and centrally controlled process 300 for determining a unique identity of an endpoint (e.g., the endpoint 128) across L3 networks. In the process 300, certain operations may occur before the network management system 110 can determine the unique identify of the endpoint 128. For example, the endpoint 128 can connect to a wireless access point (e.g., the access point 126) via an 802.11 association 302 in which the endpoint 128 and the access point 126 exchange a series of management frames to get the endpoint 128 to an authenticated and associated state.

In response to the 802.11 association 302 between the endpoint 128 and the access point 126, one or more networking devices may perform updates 304 of L3-L2 network address mapping information (e.g., DHCP, ARP, or NDP neighbor tables, etc.). For example, the L3 networking device 118 can update its ARP table with a mapping of the IP address of the endpoint 128 to the MAC address of the access switch 124; the access switch 124, which may operate as an L3 switch, can update its ARP table with a mapping of the IP address of the endpoint 128 to the MAC address of the access point 126; and the access point 126, which may also operate as an L3 switch, can update its ARP table with a mapping of the IP address of the endpoint 128 to the MAC address of the endpoint.

The updates can occur, for example, if the L3 networking device 118B provides Dynamic Host Configuration Protocol (DHCP) services for assigning L3 network addresses to endpoints and assigns an L3 network address to the endpoint 128 connecting to the network for the first time or after a predetermined period of time (e.g., a DHCP lease time). Routing from the endpoint 128 to the L3 networking device 118B for DHCP services can identify the access switch 124, the access point 126, and the L3 networking device 118B as next hops and can cause the networking devices to update their ARP tables, NDP neighbor tables, or other IP-MAC address mapping information.

As another example, the access point 126 may operate as a default gateway for the endpoint 128. The endpoint may attempt to communicate with a host in another network for the first time and transmit an ARP or NDP broadcast message to the access point 126 for the host's IP address. Routing to the external host can identify the L3 networking device 118B and the access switch 124 as next hops and can cause the L3 networking device 118B and the access switch 124 to update their ARP tables, NDP neighbor tables, or other IP-MAC address mapping information. Many other scenarios are also possible for causing networking devices to update L3-L2 network address mapping information, and one of ordinary skill can contemplate these situations and understand that they are within the scope of the present disclosure.

The network management system 110 can begin determining the unique identity of the endpoint 128 by transmitting a request 306 to the L3 networking device 118B, such as via an L3 networking device (e.g., the L3 networking device 118A) in a network management cloud (e.g., the network management cloud 102), to retrieve information to update L3-L2 network address mapping information. In some embodiments, the network management system 110 can transmit the request 306 at regular intervals of time, which can be configurable by an administrator via a user interface (e.g., the user interface layer 234). Alternatively or in addition, the request 306 may be triggered by an event, such as a networking device or endpoint disconnecting and then reconnecting to the network management system 110 due to a network failure, a networking device or endpoint connecting to the network management system 110 for the first time or after a predetermined period of time (which may also be configurable) since the device last connected to the network management system 110, a manual assignment of an L3 network address, or a restart or reconfiguration of a DHCP server, and so forth.

As discussed, the network management system 110 may directly or indirectly utilize any number of protocols or technologies for retrieving the L3-L2 network address mapping information from the networking devices and endpoints in the network. For purposes of simplicity and conciseness, the network management system 110 can utilize SNMP in this example to request ARP table information from the L3 networking device 118B. In other embodiments, the network management system 110 may receive CDP, LLDP, ISDP, or NDP neighbor device information or similar information from other discovery protocols or technologies; probe for device information using DHCP, SNMP, ICMP, ARP, NDP, or similar network management protocols and technologies; or programmatically fetch device information using APIs, such as NETCONF/YANG, gRPC, or OpenFlow™ or applications, such as SSH or Telnet, among other examples that would be known to one of ordinary skill in the art.

In response to the SNMP request 306, the L3 networking device 118B can send an SNMP response 308, which may include the IP-MAC network address mappings of the access switch 124, to the networking management system 110. In some embodiments, the L3 networking device 118B can limit the mappings in the SNMP response 308 to the IP network addresses belonging to the private cloud 104. Alternatively or in addition, the L3 networking device 118B can limit the SNMP response 308 to delta information (e.g., new or updated endpoint identities).

After receiving the L3-L2 network address mapping information from the L3 networking device 118B, the network management system 110 may analyze the L2 network addresses to determine whether any of them correspond to known networking devices, such as by referencing a device database (e.g., the device database 240), a networking device database (e.g., the networking device database 242), an endpoint database (e.g., the endpoint database 244), or similar information. In this example, the IP-MAC address mapping information (e.g., the L3 networking device's ARP table or parts of the ARP table) may include a mapping of the IP address of the endpoint 128 to the MAC address of the access switch 124, which may be a known networking device in the private cloud 104. The process 300 may proceed with the network management system 110 sending an SNMP request 310 to the access switch 124 for its IP-MAC address mapping information (e.g., the access switch's ARP table or parts of the ARP table). The access switch 124 can send an SNMP response 312 including the requested information.

The network management system 110 may subsequently parse the MAC addresses in the IP-MAC address mapping information in the SNMP response 312 to determine whether any of them correspond to known networking devices. In this example, the IP-MAC address mapping received from the access switch 124 may associate the IP address of the endpoint 128 with the MAC address of the access point 126, which may be a known networking device in the private cloud 104. As a result, the network management system 110 can send an SNMP request 314 to the access point 126 for its IP-MAC address mappings (e.g., the access point's ARP table or parts of the ARP table). The access point 126 can send an SNMP response 316 including these mappings.

The update process 300 can conclude with the network management system 110 inspecting the IP-MAC address mappings in the SNMP response 316 to evaluate whether any of the MAC addresses correspond to known networking devices. In this example, the IP-MAC address mapping received from the access point 126 can map the IP address of the endpoint 128 with its true MAC address. Hence, the network management system 110 can update the device database 240 (and/or the endpoint database 244) with the true IP-MAC address mapping for the endpoint 128.

FIG. 3B illustrates an example of a flow diagram for a centrally managed and distributed process 320 for updating mappings of L3-L2 network addresses for uniquely identifying endpoints across L3 networks. The process 320 may be similar to the process 300 in certain regards, such as including an 802.11 association 322 and updates 324 of DHCP, ARP, or NDP tables or similar IP-MAC address mapping information. However, in this example, instead of the network management system 110 directly retrieving the L3-L2 network address mapping information as in the process 300, the process 320 shows that one or more upstream networks or devices (e.g., the L3 networking device 118B and the access switch 124) can propagate requests (e.g., the SNMP requests 328 and 330, respectively) for the mapping information to downstream devices (e.g., the access switch 124 and the access point 126, respectively), wait on the downstream devices, and then transmit responses (e.g., the SNMP responses 332 and 334, respectively). The process 320 can conclude with the L3 networking device 118B transmitting a response (e.g., SNMP response 336) to the network management system 110.

FIG. 3C illustrates an example of a flow diagram for a decentralized and locally controlled process 340 for identifying unique identities of endpoints across L3 networks. In this example, instead of a centralized controller (e.g., the network management system 110) initiating the identification process and pulling L3-L2 network address mapping information from networking devices as in the process 300, one or more downstream networking device of the network (e.g., the access point 126, the access switch 124, the L3 networking device 118B, the security appliance 116B, etc.) may be capable of pushing the mapping information to upstream networking devices.

In this example, the process 340 can begin with an 802.11 association 342 and updates 344 of DHCP, ARP, or NDP neighbor tables or similar IP-MAC address mapping information. These updates can trigger the identification process commencing with the access point 126 transmitting to the access switch 124 an SNMP message 346 (or a message of another suitable protocol) that may include information advertising the mapping of the IP address of the endpoint 128 to the true MAC address of the endpoint. In turn, the access switch 124 can send an SNMP acknowledgement 348. Then, the access point 126 can send to the L3 networking device 118B a similar SNMP message 350 that may include the advertisement of the mapping of the IP address of the endpoint 128 and the endpoint's true MAC address. The L3 networking device 118B can send an SNMP acknowledgement 352. In some embodiments, the access point 126 can transmit the SNMP messages 346 and 350 concurrently.

In some embodiments, each networking device capable of initiating the endpoint identification process can maintain a local L3-L2 network address mapping database for uniquely identifying the endpoints of the network. Such a networking device can analyze traffic flowing through it, compare the L3 and L2 network addresses of the traffic to the local L3-L2 network address mapping database, and, upon detecting a new or updated L3-L2 network address mapping, transmit to one or more upstream networking devices advertisements of the new or updated mapping.

FIG. 3D illustrates an example of a flow diagram for a decentralized and distributed process 360 for identifying unique identities of endpoints across L3 networks. The process 360 may begin with an 802.11 association 362 and updates 364 of DHCP, ARP, or NDP tables or similar IP-MAC address mapping information. However, instead of the access point 126 controlling the entirety of the endpoint identification process as in the process 340, the access switch 124 can transmit an SNMP advertisement 370 to the L3 networking device 118B in response to receiving the SNMP advertisement 368 from the access point 126. The process 360 can conclude with the L3 networking device 118B transmitting to the access switch 124 an SNMP acknowledgment 372 in response to the SNMP advertisement 460.

In some embodiments, a network can perform different permutations of the centralized update processes 300 and 320 and decentralized processes 340 and 360. For example, in an embodiment, the endpoint 128 can initiate the update process by sending to the network management system an advertisement of a new or updated mapping of an IP address of the endpoint and the endpoint's true MAC address, and the network management system 110 can control the update process thereafter similarly to the process 300 or cause the SNMP message to be distributed to other networking devices of the network similarly to the process 320. In another embodiment, a networking device in the private cloud 104 (e.g., the security appliance 116B, the L3 networking device 118B, etc.) can centrally manage the update process without an external network management system. In yet another embodiment, a standalone server (e.g., physical or virtual) in the private cloud 104 can administer the update process. One of ordinary skill in the art will appreciate still other permutations may be implemented without departing from the scope of the present disclosure.

Figure 4:
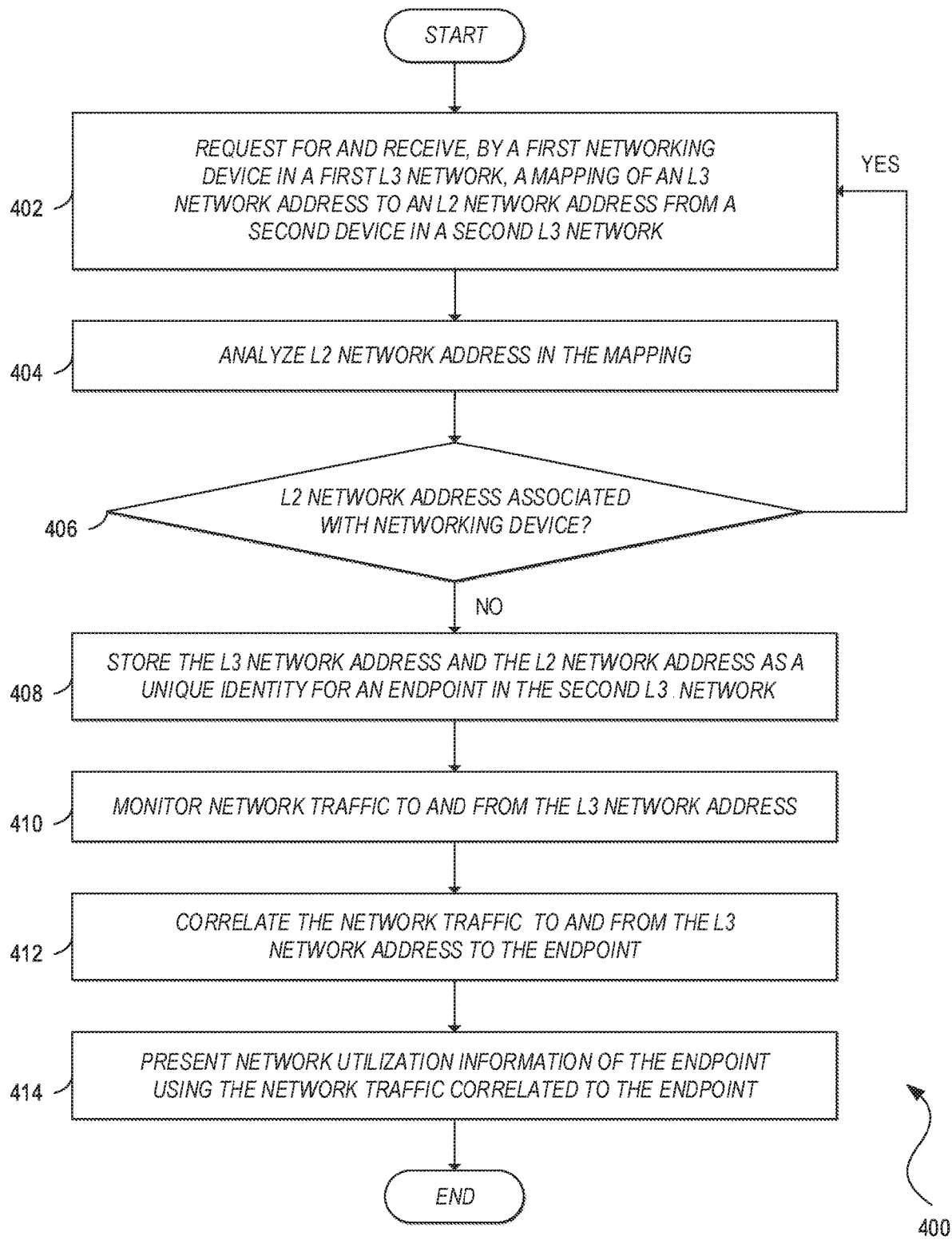
FIG. 4 illustrates an example of a process for managing unique identities of endpoints across L3 networks in accordance with an embodiment.

FIG. 4 illustrates an example of a process 400 for managing unique identities of endpoints across L3 networks. As discussed, the process 400 can be managed by a centralized network controller (e.g., the network management system 110) in a first L3 network (e.g., the network management cloud 102) or decentralized and managed by networking devices (e.g., the security appliance 116B, the L3 networking device 118B, the access switch 124, the access point 126, etc.) in a second L3 network (e.g., the private cloud 104) in which the networking devices themselves can operate as a network management system.

In this example, the process 400 can begin with step 402 in which the network management system, and in particular, a first L3 networking device (e.g., the L3 networking device 118A, the security appliance 116B, the L3 networking device 118B, the access switch 124, the access point 126, etc.) of the network management system in a first L3 network (e.g., the network management cloud 102 or, in some cases, a first L3 network segment of the private cloud 104) can receive L3-L2 network address mapping information from a second L3 networking device in a second L3 network (e.g., the private cloud 104, or in some cases, a second L3 network segment of the private cloud 104). In some embodiments, the mapping information may be received in response to a request by the first L3 networking device of the network management system. For example, the first L3 networking device can transmit an SNMP request to the second L3 networking device for the second device's ARP table, NDP neighbor table, or other IP-MAC network address mapping information. In some embodiments, the first L3 network and the second L3 network may be separate networks. For example, the first L3 network may be a cloud provider network and the second L3 network may be a private network of a customer of the cloud provider. In other embodiments, the first and second L3 networks may comprise L3 network segments of a same private network, such as a main campus network and a branch office network, a data center in a first geographic region (e.g., United States, United States West Coast, Northern California, etc.) and a data center in a second geographic region (e.g., Europe, United States East Coast, Southern California, etc.), an accounting department network and a human resources department network, and so forth.

At step 404, the network management system can analyze the L3-L2 network address mapping information to determine whether the L2 network address is associated with another networking device (e.g., a third networking device) in the second L3 network. For example, the network management system can query a device database (e.g., the device database 24), a networking device database (e.g., the networking device database 242), an endpoint database (e.g., the endpoint database 244), and/or a similar data source using a MAC address in the mapping information as a key or index for the query.

At decision block 406, if the first L2 network address is associated with a networking device, then the process 400 can return to step 402 to determine whether the first L3-L2 network address mapping information of the downstream device (e.g., the third L3 networking device) maps the first L3 network address to a networking device. Steps 402 and 404 and decision block 406 can repeat for any number of times until L3-L2 network address mapping information of a downstream device maps the first L3 network address to an endpoint. In some embodiments, the network management system may use a downstream networking device's L3 network address as an identifier for the endpoint until the network management system can identify the true L2 network address of the endpoint to avoid blocking on other network operations requiring an identifier for the endpoint.

At decision block 406, if instead the current L2 network address evaluated by the network management system is associated with an endpoint, the process 400 can proceed to step 408. At step 408, the network management system can store the first L3 network address and the current L2 network address as a unique identity of the endpoint in the second L3 network.

The process 400 may continue to step 410 in which the network management system can monitor network traffic to and from the L3 network address in the second L3 network, and step 412 in which the network management system can correlate the traffic to the endpoint based on the endpoint's unique identity. In this manner, the network management system can specify network utilization by an endpoint across L3 networks. For example, the network management system may not be in the same broadcast domain as the endpoint but the network management system may nonetheless be capable of resolving the L2 network address of the endpoint from its L3 network address based on the endpoint's unique identity.

In this manner, the network management system can also distinguish network activity by different endpoints even when the endpoints may share the same L3 network address at different times over a period of time. For example, a first endpoint may be assigned an IP address for a first part of a day and a second endpoint may be assigned the same IP address for a later part of the day. Nevertheless, the network management system can correctly attribute network activity to the IP address occurring during the first part of the day to the first endpoint and network activity to the IP address occurring during the latter part of the day to the second endpoint.

The process 400 may conclude at step 414 in which the network management system can present network utilization information of the endpoint using the network traffic correlated to the endpoint based on its unique identity.

Figure 5:
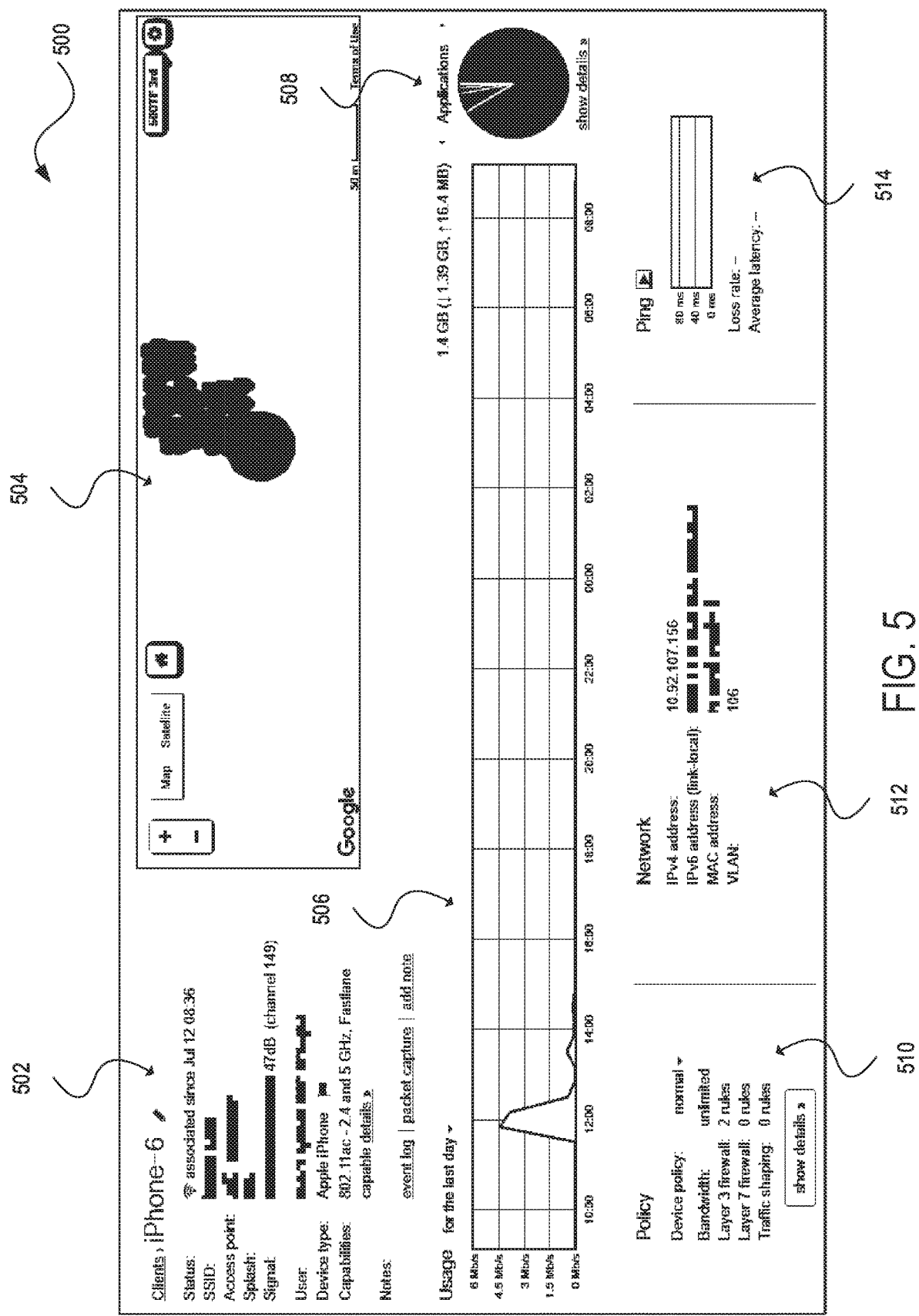
FIG. 5 illustrates an example of a graphical user interface for presenting network utilization information of an endpoint using network traffic correlated to a unique identity of the endpoint across L3 networks in accordance with an embodiment.

FIG. 5 illustrates an example of a user interface 500 for presenting network utilization information of an endpoint using traffic correlated to the unique identity of the endpoint across L3 networks. The user interface 500 is but one example of a user interface for presenting status information for an endpoint. Other embodiments may include a fewer number or a greater number of elements. In this example, the user interface 500 can include an endpoint information pane 502, a location pane 504, a network utilization pane 506, a network policy pane 510, a network information pane 512, and a network connectivity pane 514.

The endpoint information pane 502 can display various useful information regarding an endpoint, such as its host name or device name, connection status with respect to a network management system, SSID, access point, radio frequency (RF) signal strength, RF channel, user, type, manufacturer, model number, capabilities, and other metadata. The location pane 504 can display a geographical location of the endpoint. The network utilization pane 506 can include a summary view (e.g., an x-y graph) of bandwidth usage (e.g., Mb/s, Gb/s, etc.) over a period of time (e.g., hour, day, week, month, etc.). The network utilization pane 506 can also include a total number of bytes downloaded and uploaded over the same period. In addition, the network utilization pane 506 can enable a user to select a finer grain view of the endpoint's network activity, such as a view of the endpoint's frames, packets, flows, connections, sessions, or other network data at various levels of granularity. In some embodiments, the network utilization pane 506 can display a summary view 508 (e.g., pie graph) of network utilization by the applications running on the endpoint.

The network policy pane 510 can display network policies associated with the endpoint, such as bandwidth limits, the number of L3 firewall rules, the number of Layer 7 firewall rules, the number of traffic shaping rules, and so forth. The network information pane 512 can display network-related information regarding the endpoint, such as its IPv4 address, IPv6 address, MAC address, VLAN, and so forth. The network connectivity pane 514 can display the current state of the endpoint's network connection, such as the amount of network latency, packet loss rate, average latency, and so forth.

Figure 6:
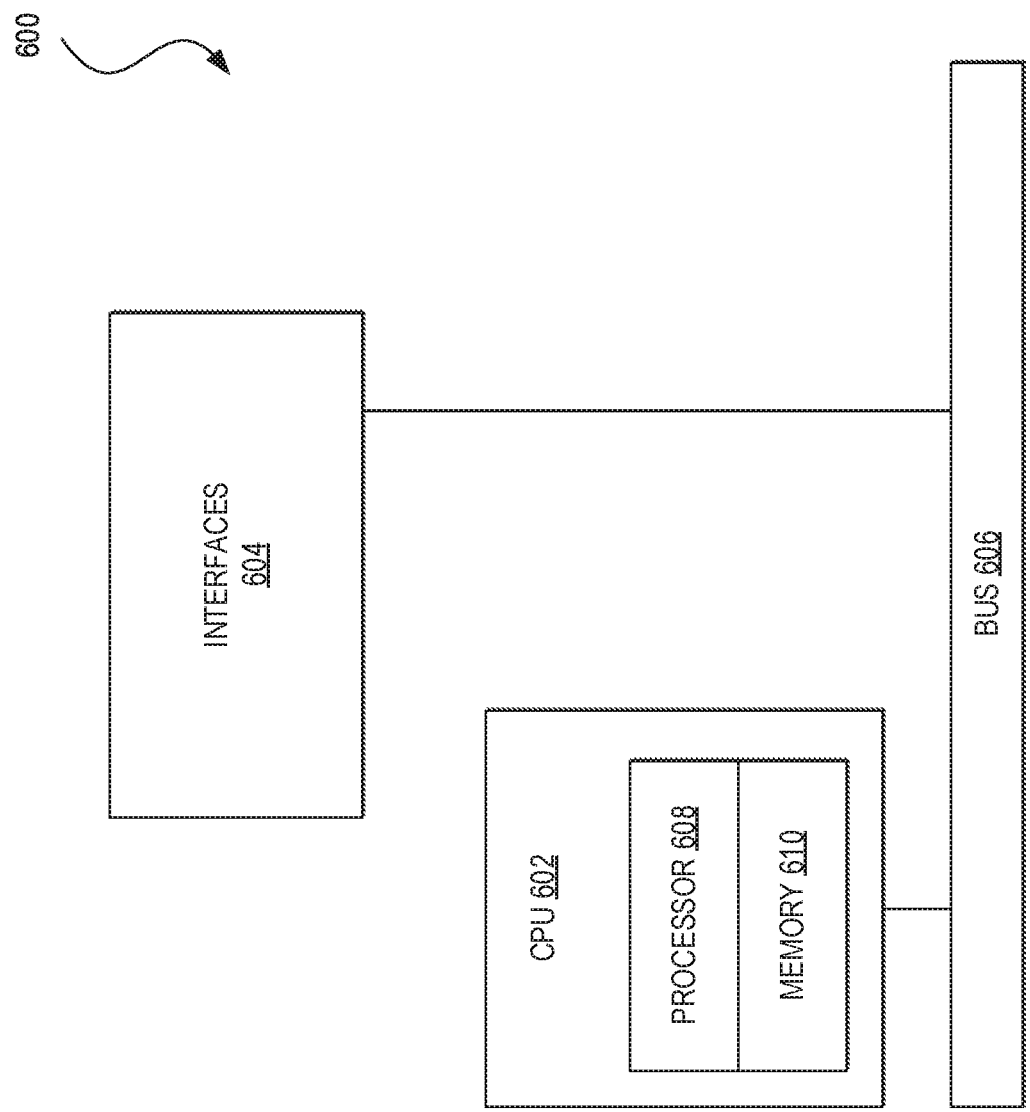
FIG. 6 illustrates an example of a networking device in accordance with an embodiment.

FIG. 6 illustrates an example of a networking device 600 (e.g., the security appliances 116, the L3 networking devices 118, the access switch 124, the access points 126, etc.). The networking device 600 can include a master central processing unit (CPU) 602, interfaces 604, and a bus 606 (e.g., a PCI bus). When acting under the control of appropriate software or firmware, the CPU 602 can be responsible for executing packet management, error detection, and/or routing functions. The CPU 602 preferably accomplishes all these functions under the control of software including an operating system and any appropriate applications software. The CPU 602 may include one or more processors 608 such as a processor from the Motorola family of microprocessors or the MIPS family of microprocessors. In an alternative embodiment, the processor 608 can be specially designed hardware for controlling the operations of the networking device 600. In an embodiment, a memory 610 (such as non-volatile RAM and/or ROM) can also form part of the CPU 602. However, there are many different ways in which memory could be coupled to the system.

The interfaces 604 can be provided as interface cards (sometimes referred to as line cards). The interfaces 604 can control the sending and receiving of data packets over the network and sometimes support other peripherals used with the networking device 600. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 604 may include ports appropriate for communication with the appropriate media. In some cases, the interfaces 604 may also include an independent processor and, in some instances, volatile RAM. The independent processors may control communication intensive tasks such as packet switching, media control, and management. By providing separate processors for the communication intensive tasks, the interfaces 604 may allow the CPU 602 to efficiently perform routing computations, network diagnostics, security functions, and so forth.

Although the system shown in FIG. 6 is an example of a networking device of an embodiment, it is by no means the only networking device architecture on which the subject technology can be implemented. For example, an architecture having a single processor that can handle communications as well as routing computations and other network functions, can also be used. Further, other types of interfaces and media may also be used with the networking device 600.

Regardless of the networking device's configuration, it may employ one or more memories or memory modules (including the memory 610) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 7A:
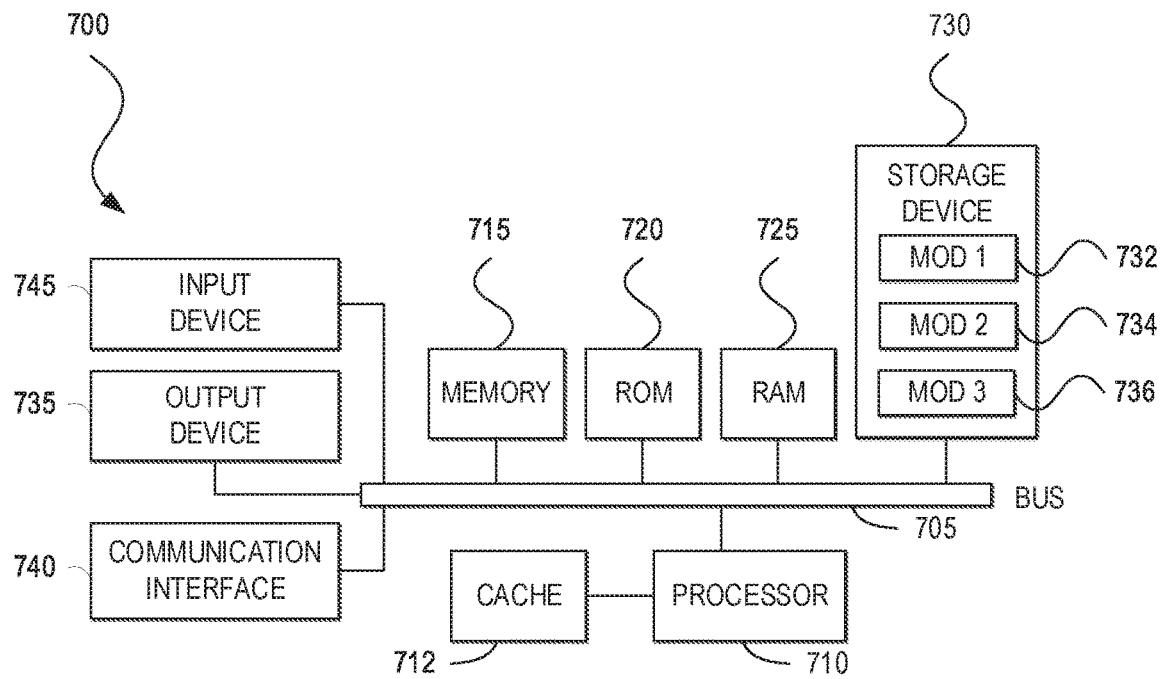
FIGS. 7A and 7B illustrate examples of systems in accordance with some embodiments.
Figure 7B:
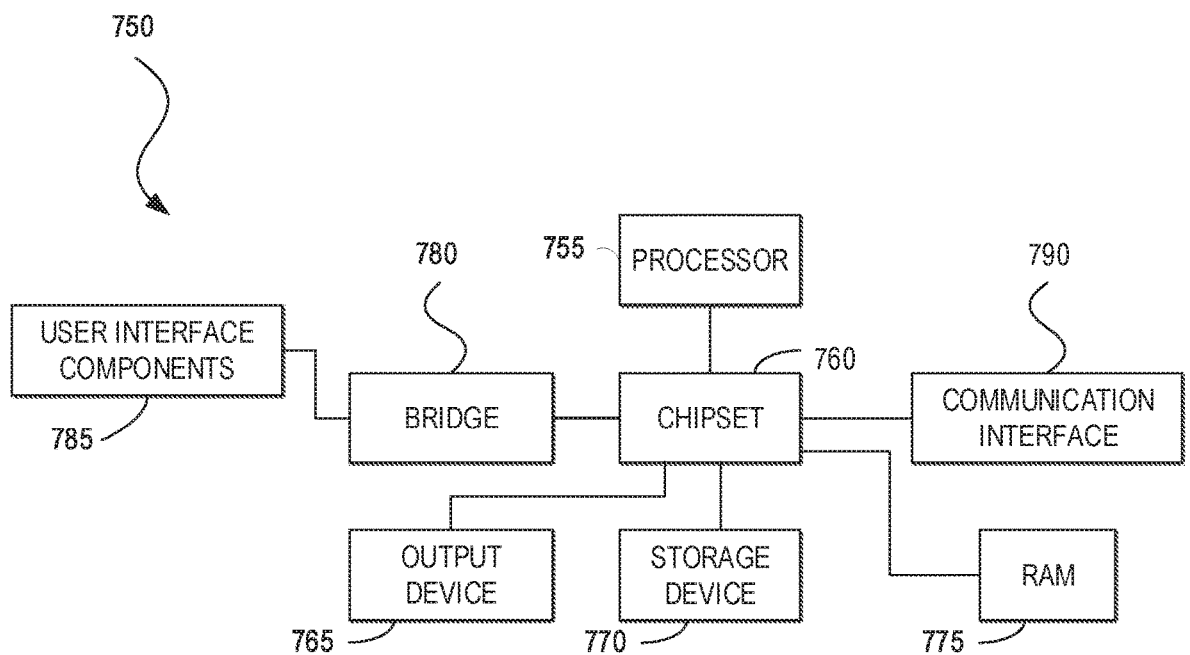

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:

transmitting, from a network management system in a first Layer 3 (L3) network to a first networking device in the first L3 network, at a configurable interval or in response to a network failure, a request for a first L3-Layer 2 (L2) mapping to determine a unique identity of an endpoint of a second L3 network;

receiving, over a secure connection by the first networking device, the first L3-L2 mapping from a second networking device in the second L3 network, wherein the secure connection is established between a first security appliance of the first L3 network and a second security appliance of the second L3 network;

determining, by the network management system and based on the first L3-L2 mapping, whether an L2 network address in the first L3-L2 mapping is associated with a third networking device or the endpoint;

in response to determining that the L2 network address is associated with the third networking device, receiving, by the network management system, a second L3-L2 mapping from the third networking device;

determining, by the network management system and based on the second L3-L2 mapping, whether an L2 network address in the second L3-L2 mapping is associated with a fourth networking device or the endpoint;

in response to determining that the L2 network address in the first L3-L2 mapping or the second L3-L2 mapping is associated with the endpoint, storing, by the network management system, an L3 network address associated with the L2 network address and the L2 network address as an identity of the endpoint;

monitoring network traffic to and from the L3 network address;
correlating the monitored network traffic with the endpoint based on the identity of the endpoint; and
presenting, by the network management system at a graphical user interface, metadata of the endpoint, one or more network policies associated with the endpoint, and network utilization information of the endpoint using the correlation of the monitored network traffic to and from the L3 network address of the endpoint including at least a graph of the network utilization information over a period of time related to the network failure.

2. The computer-implemented method of claim 1, further comprising: resolving an L2 network address of the endpoint from the L3 network address of the endpoint based on the identity of the endpoint.

3. The computer-implemented method of claim 1, further comprising:
correlating the network traffic to the L3 network address to the endpoint within a first portion of a period of time that the endpoint is assigned to the L3 network address; and
correlating second network traffic to the L3 network address to a second endpoint within a second portion of the period of time that the second endpoint is assigned to the L3 network address.

4. The computer-implemented method of claim 1, further comprising:
transmitting a first Simple Network Management Protocol (SNMP) message to the first networking device requesting for one of an Address Resolution Protocol (ARP) table or a Neighbor Discovery Protocol (NDP) neighbor table of the first networking device.

5. The computer-implemented method of claim 4, further comprising:
transmitting a second SNMP message to the second networking device requesting for one of an ARP table or a NDP neighbor table of the second networking device.

6. The computer-implemented method of claim 5, wherein the second SNMP message it transmitted prior to the network management system receiving an SNMP response to the first SNMP message.

7. The computer-implemented method of claim 5, wherein the second SNMP message it transmitted after the network management system receives an SNMP response to the first SNMP message.

8. The computer-implemented method of claim 4, wherein the first SNMP message is transmitted at a regular interval of time.

9. The computer-implemented method of claim 4, wherein the first SNMP message is transmitted in response to the network management system detecting a connection from the L3 network address after a predetermined period of time from a last connection.

10. The computer-implemented method of claim 1, further comprising:
querying a database including Media Access Control (MAC) addresses for networking devices of the second L3 network.

11. The computer-implemented method of claim 1, further comprising:
querying a database including Media Access Control (MAC) addresses for endpoints of the second L3 network.

12. The computer-implemented method of claim 1, wherein the secure connection is a secure tunnel between the first networking device and the second networking device.

13. A system comprising:
one or more processors; and
at least one computer-readable storage medium having stored therein instructions which, when executed by the one or more processors, cause the one or more processors to:
transmit, from the system in a first Layer 3 (L3) network to a first networking device in the first L3 network, at a configurable interval or in response to a network failure, a request for a first L3-Layer 2 (L2) mapping to determine a unique identity of an endpoint of a second L3 network;
receive, over a secure connection by the first networking device, the first L3-L2 mapping from a second networking device in a second L3 network, wherein the secure connection is established between a first security appliance of the first L3 network and a second security appliance of the second L3 network;
determine, based on the first L3-L2 mapping, whether a Media Access Control (MAC) address in the first L3-L2 mapping is associated with a third networking device or the endpoint;
in response to determining that the MAC address is associated with the third networking device, receive a second L3-L2 mapping from the third networking device;
determine, based on the second L3-L2 mapping, whether a MAC address in the second L3-L2 mapping is associated with a fourth networking device or the endpoint;
in response to determining that the MAC address in the first L3-L2 mapping or the second L3-L2 mapping is associated with the endpoint, store an Internet Protocol (IP) address associated with the MAC address and the MAC address as an identity of the endpoint;
monitor network traffic to and from the IP address;
correlate the monitored network traffic with the endpoint based on the identity of the endpoint; and
present, at a graphical user interface, metadata of the endpoint, one or more network policies associated with the endpoint, and network utilization information of the endpoint using the correlation of the monitored network traffic to and from the IP address of the endpoint including at least a graph of the network utilization information over a period of time related to the network failure.

14. The system of claim 13, further comprising instructions which when executed further cause the one or more processors to:
resolve a MAC address of the endpoint from the IP address of the endpoint based on the identity of the endpoint.

15. The system of claim 13, further comprising instructions which when executed further cause the one or more processors to:
correlate the network traffic to the IP address to the endpoint within a first portion of a period of time that the endpoint is assigned to the IP address; and
correlate second network traffic to the IP address to a second endpoint within a second portion of the period of time that the second endpoint is assigned to the IP address.

16. The system of claim 13, further comprising instructions which when executed further cause the one or more processors to:
query a database including MAC addresses for networking devices of the second L3 network using the first MAC address as a query.

17. A non-transitory computer-readable storage medium having stored therein instructions which, when executed by one or more processors of a system, cause the system to:
transmit, from the system in a first Layer 3 (L3) network to a first networking device in the first L3 network, at a configurable interval or in response to a network failure, a request for a first L3-Layer 2 (L2) mapping to determine a unique identity of an endpoint of a second L3 network;
receive, over a secure connection by the first networking device, the first L3-L2 mapping from a second networking device in a second L3 network, wherein the secure connection is established between a first security appliance of the first L3 network and a second security appliance of the second L3 network;
determine, based on the first L3-L2 mapping, whether a Media Access Control (MAC) address in the first L3-L2 mapping is associated with a third networking device or the endpoint;
in response to determining that the MAC address is associated with the third networking device, receive a second L3-L2 mapping from the third networking device;
determine, based on the second L3-L2 mapping, whether a MAC address in the second L3-L2 mapping is associated with a fourth networking device or the endpoint;
in response to determining that the MAC address in the first L3-L2 mapping or the second L3-L2 mapping is associated with the endpoint, store an Internet Protocol (IP) address associated with the MAC address and the MAC address as an identity of the endpoint;
monitor network traffic to and from the IP address;
correlate the monitored network traffic with the endpoint based on the identity of the endpoint; and
present, at a graphical user interface, metadata of the endpoint, one or more network policies associated with the endpoint, and network utilization information of the endpoint using the correlation of the monitored network traffic to and from the IP address of the endpoint including at least a graph of the network utilization information over a period of time related to the network failure.

18. The non-transitory computer-readable storage medium of claim 17, further comprising instructions which when executed further cause the system to:
transmit a first Simple Network Management Protocol (SNMP) message to the first networking device requesting for one of an Address Resolution Protocol (ARP) table or a Neighbor Discovery Protocol (NDP) neighbor table of the first networking device; and
transmit a second SNMP message to the second networking device requesting for one of an ARP table or a NDP neighbor table of the second networking device.

19. The non-transitory computer-readable storage medium of claim 18, wherein the second SNMP message it transmitted prior to the system receiving an SNMP response to the first SNMP message.

20. The non-transitory computer-readable storage medium of claim 18, wherein the first SNMP message is transmitted at a regular interval of time.

* * * * *